US008686873B2

(12) United States Patent
Demirdjian et al.

(10) Patent No.: US 8,686,873 B2
(45) Date of Patent: Apr. 1, 2014

(54) TWO-WAY VIDEO AND 3D TRANSMISSION BETWEEN VEHICLES AND SYSTEM PLACED ON ROADSIDE

(75) Inventors: David Demirdjian, San Francisco, CA (US); Steven F. Kalik, Arlington, MA (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 385 days.

(21) Appl. No.: 13/037,000

(22) Filed: Feb. 28, 2011

(65) Prior Publication Data

US 2012/0218125 A1 Aug. 30, 2012

(51) Int. Cl.
*G08G 1/09* (2006.01)
*B60Q 1/00* (2006.01)
*H04N 7/18* (2006.01)

(52) U.S. Cl.
USPC ........ 340/905; 340/937; 340/425.5; 348/135; 348/148; 348/149; 701/117

(58) Field of Classification Search
USPC ........................... 340/905; 348/135, 148, 149
See application file for complete search history.

(56) References Cited

U.S. PATENT DOCUMENTS

| | | | |
|---|---|---|---|
| 5,396,429 A | 3/1995 | Hanchett | |
| 6,275,773 B1 | 8/2001 | Lemelson et al. | |
| 6,285,297 B1 | 9/2001 | Ball | |
| 6,285,317 B1 | 9/2001 | Ong | |
| 6,429,789 B1 * | 8/2002 | Kiridena et al. | 340/905 |
| 6,556,917 B1 | 4/2003 | Wawra et al. | |
| 6,654,681 B1 | 11/2003 | Kiendl et al. | |
| 2004/0015290 A1 | 1/2004 | Curbow et al. | |
| 2008/0288162 A1 | 11/2008 | Theimer et al. | |
| 2009/0033540 A1 | 2/2009 | Breed et al. | |
| 2009/0048768 A1 | 2/2009 | Taguchi | |

* cited by examiner

*Primary Examiner* — Donnie Crosland
(74) *Attorney, Agent, or Firm* — Oblon, Spivak, McClelland, Maier & Neustadt, L.L.P.

(57) ABSTRACT

A system and method for providing visual information to a driver of a first vehicle, including: at least one camera or sensor which is not on the first vehicle but which captures image data that includes a view of a road within a vicinity of the first vehicle; a decision unit which receives the image data from the camera or sensor and which identifies information in the image data which a driver of the first vehicle needs to be informed of; and a display unit on the first vehicle which displays information transmitted to the first vehicle in a view that displays information determined to be missing in the vehicle's current line of sight, so that the otherwise missing information can be observed by a driver of the first vehicle.

20 Claims, 12 Drawing Sheets

TWO-WAY VIDEO AND 3D TRANSMISSION BETWEEN VEHICLES AND SYSTEM PLACED ON ROADSIDE

BACKGROUND

1. Field

This specification is directed to a system and method for providing traffic and street information by gathering videos and 3D information from sensors placed on the roadside and on moving vehicles.

2. Description of the Related Art

When operating a vehicle, there is a need for a driver to receive information related to images of the external environment beyond what the driver can actually see.

Related art systems receive or transmit images captured by other vehicles on the road (i.e., they only use videos from static cameras). Additionally, the related systems described above only utilize video cameras, and not 3D sensors.

SUMMARY

According to an embodiment of the present invention, there is provided a system for providing visual information to a driver of a first vehicle, including at least one camera or sensor which is not on the first vehicle but which captures image data that includes a view of a road within a vicinity of the first vehicle; a decision unit which receives the image data from the camera or sensor and which identifies information in the image data which a driver of the first vehicle needs to be informed of; and a display unit on the first vehicle which displays information transmitted to the first vehicle in a view that displays information determined to be missing in the vehicle's current line of sight, so that the otherwise missing information can be observed by a driver of the first vehicle.

According to an embodiment of the present invention, there is a method provided which is incorporated on a system for providing visual information to a driver of a first vehicle, including capturing from at least one camera or sensor image that is not on the first vehicle, data that includes a view of a road within a vicinity of the first vehicle; receiving, at a receiver, image data from the at least one camera or sensor; receiving, at a decision unit, the image data from the receiver, which includes a view of an area within the vicinity of the first vehicle, and determining information in the image data which the driver of the first vehicle needs to be informed of and selecting a view for displaying the determined information to a driver of the first vehicle; and displaying, at a display unit on the first vehicle, a view determined by the decision unit to include information in the image data of which a driver of the first vehicle needs to be informed.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION

Figure 1:
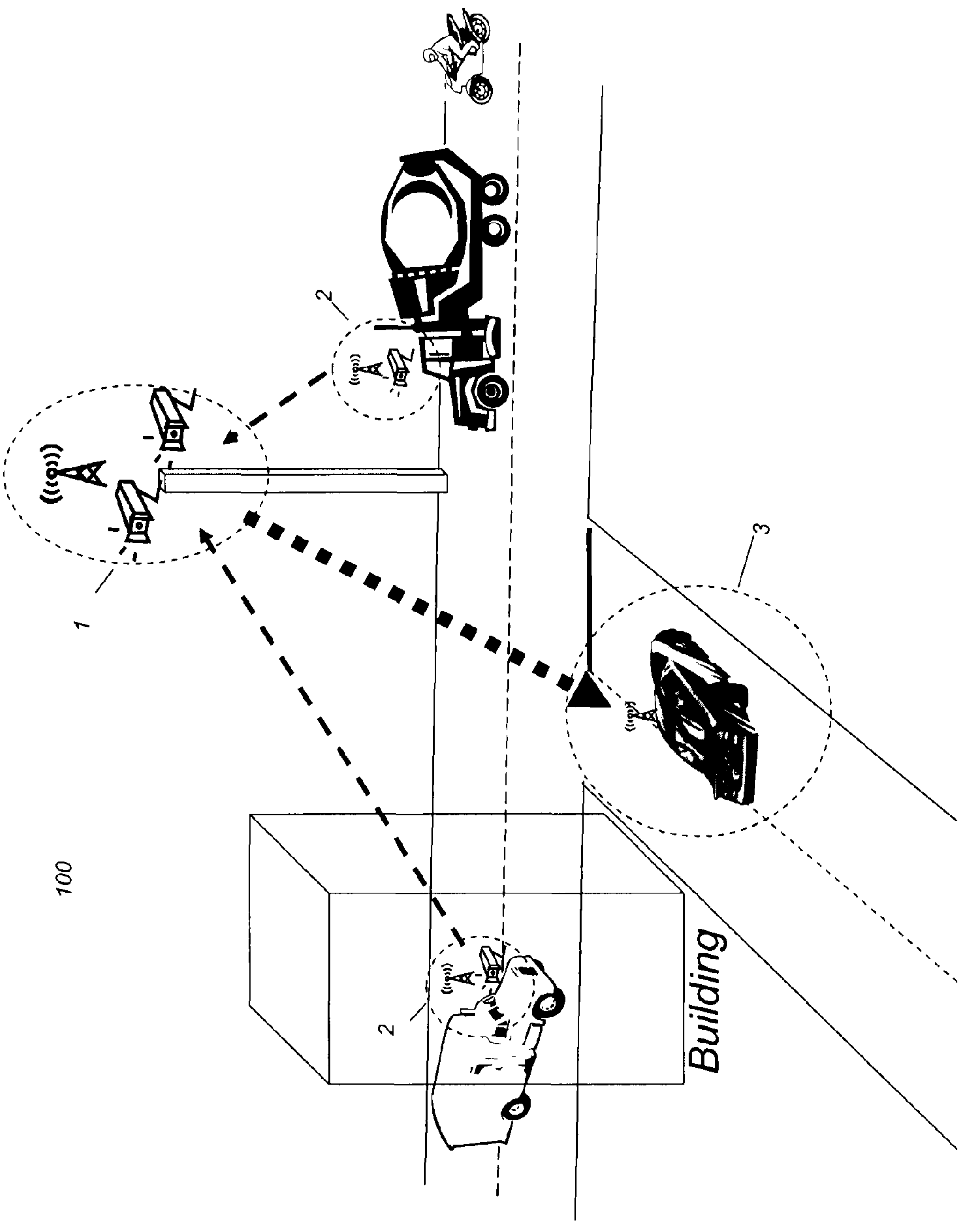
FIG. 1 shows a view of a system according to an embodiment of the present invention.

FIG. 1 illustrates an overview of a system 100 according to an embodiment of the present invention. FIG. 1 shows the system 100 as operated in a traffic scene which includes different cameras or sensors mounted to different types of objects. The system 100 includes a fixed camera system 1, a plurality of moving camera systems 2, and a user vehicle system 3, which will be discussed in more detail below. The number of fixed camera systems, moving camera systems, and user vehicles are not limited to the amount shown in FIG. 1.

Figure 2:
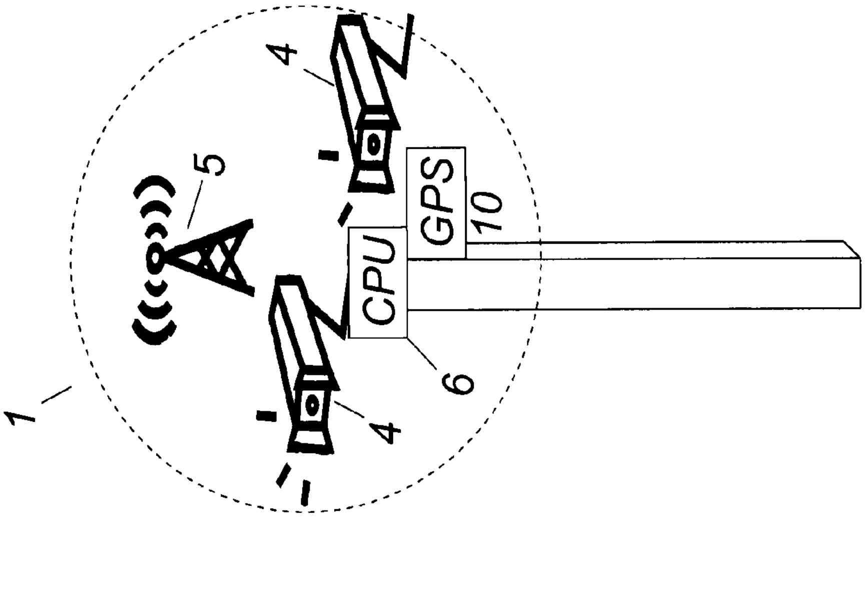
FIG. 2 shows a view of a fixed camera system according to an embodiment of the present invention.

FIG. 2 shows the fixed camera system 1 in more detail. The fixed camera system 1 includes fixed cameras 4, communication unit 5, and a central processing unit (CPU) 6. It should be appreciated that there could be any number of fixed cameras, communication units, or CPUs in the fixed camera system.

Each fixed camera 4 may be a video camera for taking moving pictures and still image frames as is known in the art.

Each fixed camera 4 may also be a 3D camera or sensor. Examples of 3D sensors are Radio Detection And Ranging (RADAR) and Light Detection and Ranging (LIDAR) sensors which are known in the art. Another example of a 3D camera is a time of flight (TOF) camera. Generally, a TOF camera is one that uses light pulses to illuminate an area, receives reflected light from objects, and determines the depth of an object based on the delay of receiving the incoming light. Yet another example of a 3D camera is a stereo camera system, which is known in the art and uses two separate cameras or imagers spaced apart from each other to simulate human binocular vision. In the stereo camera system, the two separate cameras take two separate images and a central computer identifies the differences between the two images to extract 3-dimensional structure from the observed scene.

The fixed camera system 1 also includes a communication unit 5. An example of the communication unit is an antenna which can transmit and receive data over a wireless network as is known in the art. As a receiver, the communication unit 5 is configured to receive information, such as image data, video data, and GPS data from the moving camera systems 2. As a transmitter, the communication unit 5 is configured to transmit image data, video data, and GPS data to the user vehicle 3 as well as any of the moving camera systems 2. The communication between the different communication units in the system described herein may take place directly or via a base station or satellite as is known in the art of wireless communication systems.

The fixed camera system 1 may include a GPS unit/receiver 10. GPS receivers, which are known in the art, provide location information for the location of the GPS receiver and hence the vehicle or fixed camera system 1 at which the GPS receiver is located. The fixed camera system 1 may also include a sensor provided with the fixed camera which determines an angle or orientation of the fixed camera. The fixed camera system may also have its orientation identified by reference to a visible reference marker location identifiable in the camera image. This allows the orientation of the camera to be calculated by computing the vector from the GPS identified location of the camera to the GPS known location of the reference marker, with the camera orientation being identified in greater detail by the offset for the reference marker from the center of the camera image.

The fixed camera system 1 includes a central processing unit (CPU) 6. The CPU 6 performs necessary processing for receiving the image data and video data from the fixed cameras 4 co-located at the fixed camera system 1, or receiving image data, video data, and GPS data from one or more of the moving camera systems 2. The CPU 6 also performs necessary processing for transmitting image data, video data, and/or GPS data to the user vehicle 3 or any of the moving camera systems 2.

The fixed camera system may also perform processing to determine which images, video, or data received from the various fixed cameras and moving cameras will be provided to the user vehicle. For instance, if there are multiple images or videos receiving from different cars, which each have a moving camera, and if these images or videos show similar information to each other (for example videos from two cars adjacent to each other), then it would be inefficient to use all image/video information received from all of these different vehicles. Therefore, to make an efficient use of bandwidth, the fixed camera system may perform processing to exclude redundant images, video, or data. This may be accomplished by comparing the image and video data, and selecting images, video, or data which include new objects and information which are not already included in other images and video.

It is noted that while the preceding example describes the fixed camera system as having the fixed cameras 4 as well as having the function of being a central receiver and transmitter for the moving camera systems and the user vehicle, the fixed camera system may have these functions separated.

Figure 3:
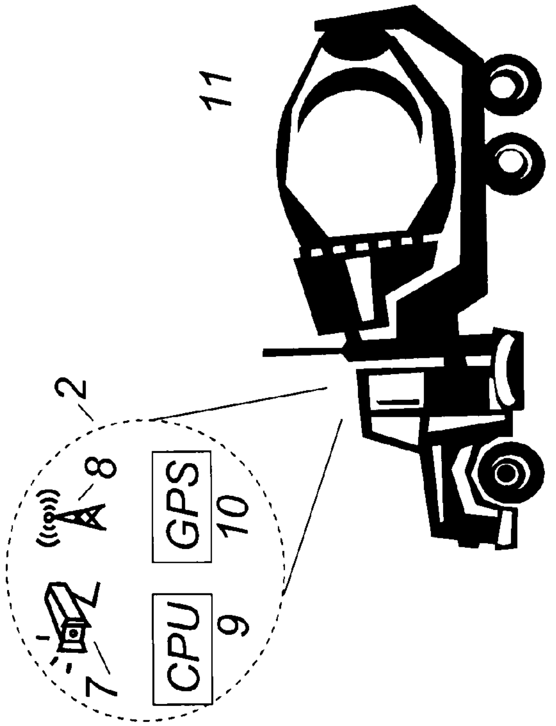
FIG. 3 shows a view of a moving camera system according an embodiment of the present invention.

FIG. 3 shows the moving camera system 2 in more detail. The moving camera system 2 includes a camera or sensor 7, a communication unit 8, a CPU 9, and a GPS unit 10. The camera or sensor 7 on the moving camera system may be one of the same types of cameras described above for the fixed camera system 1 and captures image data viewed from the vehicle 11. Additionally, the communication unit 8 may be one of the same types of communication units described above for the fixed camera system 1.

The moving camera system 2 may include a GPS unit/receiver 10 and an orientation sensor similar to those described above for the fixed camera system. However, for moving vehicles, the orientation of the vehicle may also be learned from the orientation of the vehicles motion. This motion may be identified by tracking the change in the GPS location of the vehicle over time. That is, if the GPS position changes with time, the direction of the most recent change can be used to infer the orientation of the vehicle's motion, and by implication, the vehicle's orientation. If necessary, the vehicle's orientation can be further identified by explicitly representing the orientation of the vehicles front relative to the direction of the vehicle's front (for example by receiving from the vehicle the gear it is in, to determine if vehicle motion is forward or reverse, and then calculating direction of vehicle orientation from direction of vehicle movement).

The moving camera system 2 also includes a central processing unit (CPU) 9. The CPU 9 performs necessary processing for receiving image/video data and GPS data from one or both of the camera 7 and the GPS unit 10 transmitting image data, video data, and/or GPS data to the fixed camera system 1 via the communication unit 8.

It is noted that the moving camera system is not limited to having just one camera and there may be a plurality of cameras mounted on the vehicle 11 for providing images or video of a plurality of views surrounding the vehicle 11.

Figure 4:
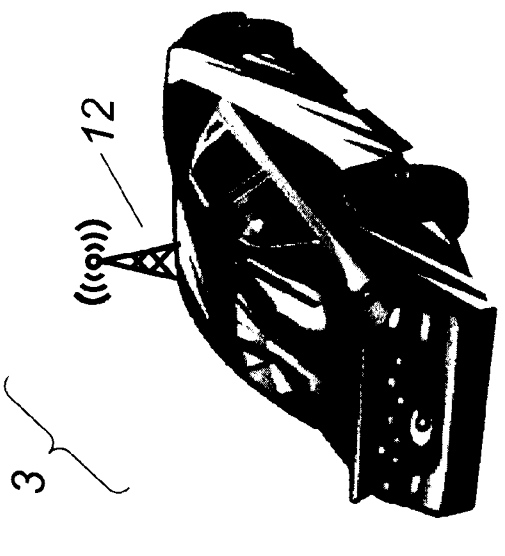
FIG. 4 shows a view of a user vehicle system according an embodiment of the present invention.

FIG. 4 shows the user vehicle system 3 in more detail. FIG. 4 shows that the user vehicle system 3 includes a communication unit 12. The communication unit 12 may be one of the same types of communication units described above for the fixed camera system 1 or the moving camera system 2. The communication unit 12 receives some or all of the image data, video data, and GPS data transmitted from the fixed camera system 1, which may include image or video data from all of the fixed cameras 4 and the moving cameras 7, and/or GPS location information from the GPS unit 10.

Figure 5:
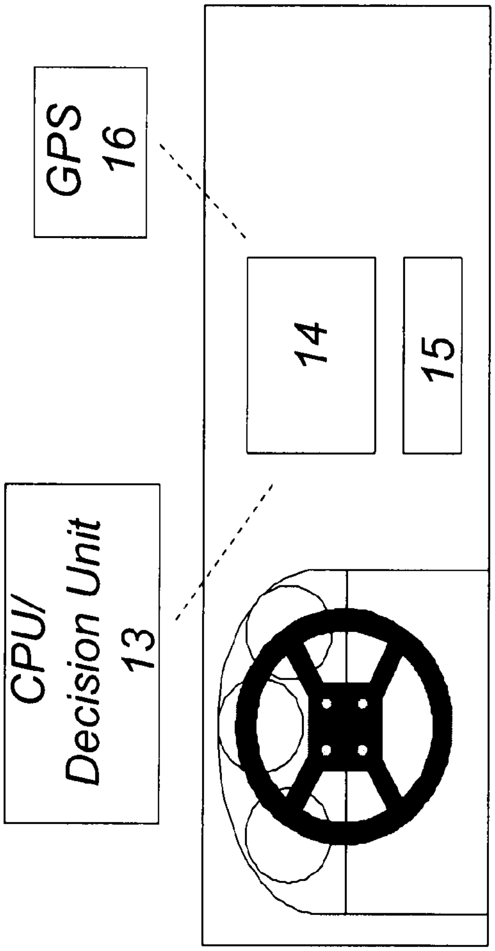
FIG. 5 shows a view of a components of the user vehicle system according to an embodiment of the present invention.

FIG. 5 shows additional components of the user vehicle system 3 within the interior of the user vehicle. FIG. 5 shows that the user vehicle system 3 also includes a CPU/Decision Unit 13, a display 14, and a user input device 15.

The Decision Unit 13 is connected to the communication unit 12 and processes the various information received from the fixed camera station. The processes performed by the Decision Unit 13, which will be discussed in more detail below, determine a most informative view to display to the driver of the user vehicle according to available data and or user preferences as described below.

The display 14 displays video and/or image information for the driver of the user vehicle, which further includes displaying a "most informative view" to the driver, which will be discussed in detail below.

The user input device 15 allows a user to input requests and to change or configure what is being displayed by the display 14. For example, the user may use the input device to request that a most informative view is displayed. Alternatively, the user may use the input device to view any or all of the images or video sent from the fixed camera system 1. An example of a user input device may be a keyboard type of interface as is readily understood in the art. In an alternate embodiment, the display 14 and the user input device 15 may also be combined through the use of touch screen displays, as are also known in the art.

Next, an exemplary process performed by the Decision Unit 13 will be described with reference to FIGS. 6-10.

As mentioned above, the Decision Unit 13 receives a collection of image data, video data, and/or GPS data transmitted from the fixed camera system 1.

It is noted that there may be no restrictions on the proximity of the sources of the image data, video data, and/or GPS data received at the Decision Unit. However, for efficiency, the sources of the image data, video data, and/or GPS data may be limited based on the needs of the user vehicle. The area from which the sources are selected will be referred to as a "relevant vicinity." For example, the relevant vicinity may be restricted to sources pertaining to an explicit destination of the user vehicle. The user may input its desired destination through the user input device 15 described above, and this input may be transmitted to the fixed camera system, which will receive image data, video data, and/or GPS data from fixed cameras and moving cameras within a predetermined distance from the inputted destination.

The relevant vicinity may also pertain to the route that the user is presently traveling. For example, sources may be restricted to an area pertaining to an area along the route that the user vehicle is approaching. The system can further determine such an area based on the current speed of the vehicle so that the area is not one that will be quickly passed by the user vehicle if it is moving at a high rate of speed (for example, on a highway). Additionally, the relevant vicinity may pertain to an event that is potentially on a route that a user is presently traveling. For example, the system can receive information of an accident that is potentially on a route that a user is presently traveling, and the relevant vicinity will be the accident scene.

A particularly useful embodiment of the relevant vicinity may be a continuously updating vicinity based on the user vehicle's current position, speed, and the immediate next short segments of the route over which the user vehicle will pass in some fixed or varying time. This selection allows essentially real-time updating of the scene just ahead of the user. Because the display 14 in this case now includes information received through communication unit 12 from fixed camera systems 1 and moving camera systems 2 in the immediately upcoming route segment relevant vicinity, the display 14 provides additional image and video information visible to other fixed camera systems 1 and moving camera systems 2 to supplement the information already visible out the user vehicle windows or through any existing moving camera systems on board the user's vehicle. This increases the amount of useful information available to the driver, offering them additional information about the environment in their relative vicinity, upon which they can base their decisions when selecting driving actions and tactics in the current and immediately upcoming section of the route.

The relevant vicinity may also be based on user history information or preferences. For example, the area near a user vehicle's home or work may be a relevant vicinity.

The Decision Unit also receives an input of the user vehicle location from the GPS unit 16. The Decision Unit processes the different information it receives and determines a most informative view to display for the driver of the user vehicle.

In one example, the most informative view may be a view which contains objects which the driver cannot see for various reasons. For example, FIGS. 6A and 6B show two different images corresponding to the traffic scene depicted in FIG. 1, which are transmitted from the fixed camera station to the user vehicle.

Figure 6B:
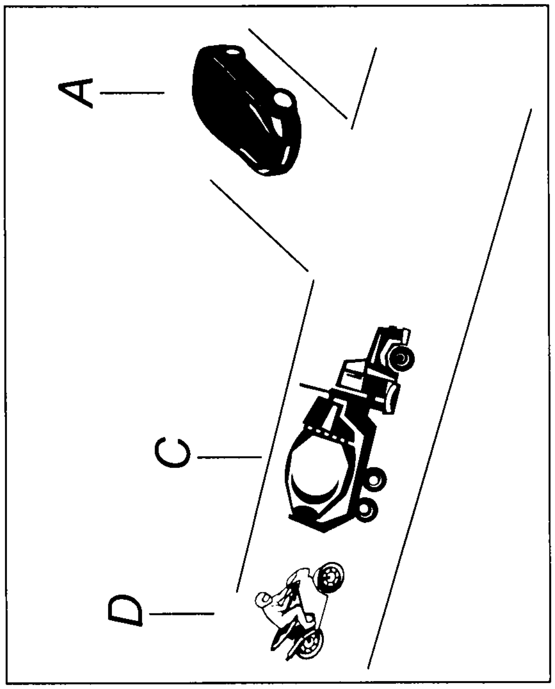
FIGS. 6A and 6B show different views received from different cameras or sensors according to an embodiment of the present invention.
Figure 6A:
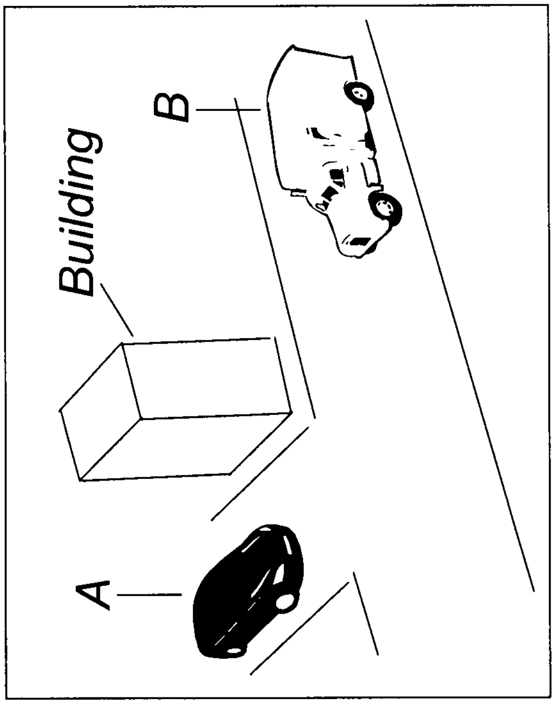

Using multiple views, such as those shown in FIGS. 6A and 6B, received from the various cameras or sensors, and using GPS location information of the user vehicle and the other vehicles which operate in the system, the decision unit is capable of developing a common model or global representation which combines information contained in the separate views to analyze the visibility of the objects contained in the views to determine a most informative view.

Figure 7:
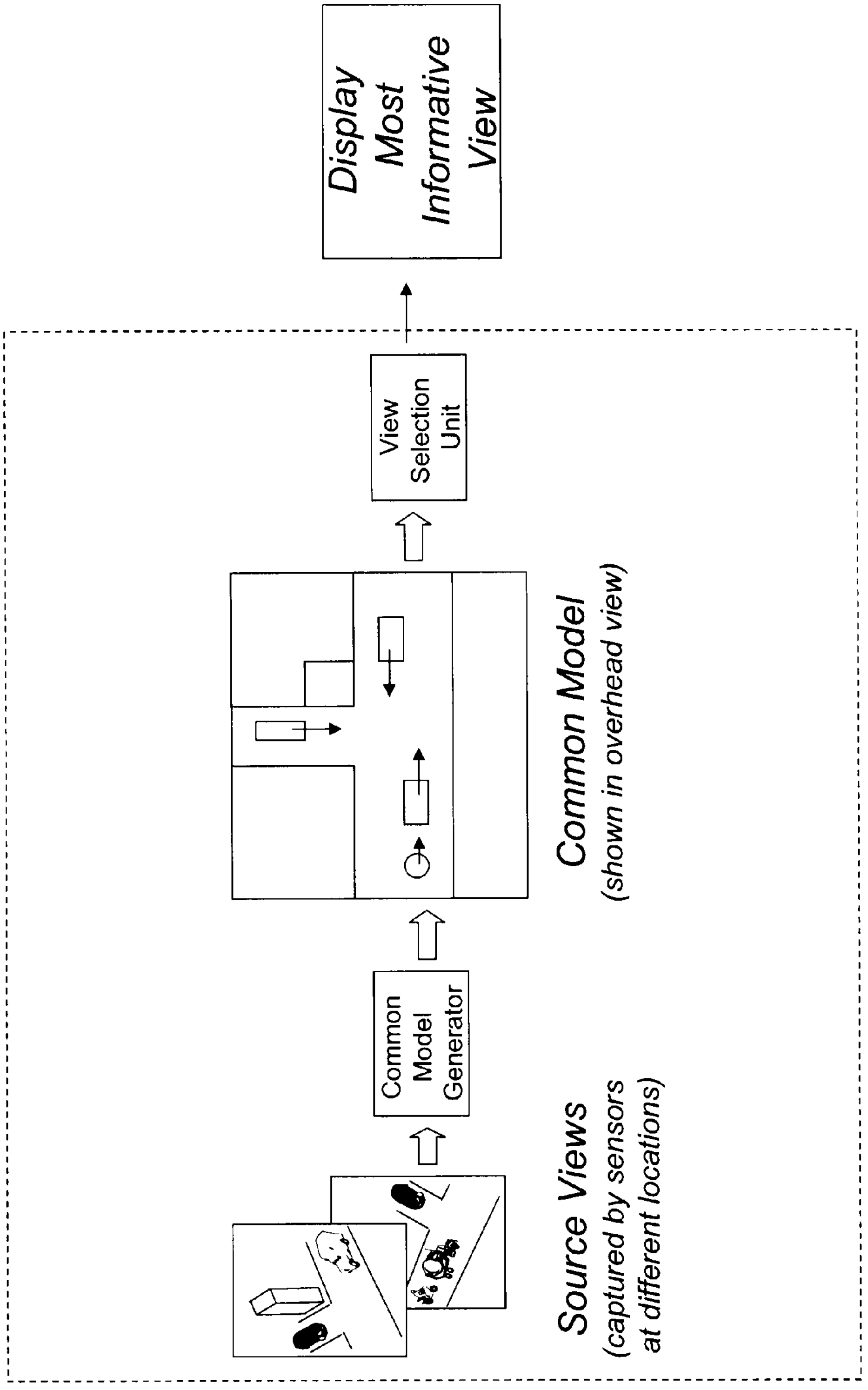
FIG. 7 shows an overview of processes performed by the common model generator and the view selection unit according an embodiment of the present invention.

Thus, the Decision Unit may comprise two parts: a common model generator and a view selection unit. FIG. 7 shows an overview of the processes performed by the common model generator and the view selection unit. The common model generator takes the various image data, video data, and GPS data received from the fixed camera station and uses it to generate a common model. The view selection unit then analyzes the common model and determines an informative view to display for the user.

Figure 8:
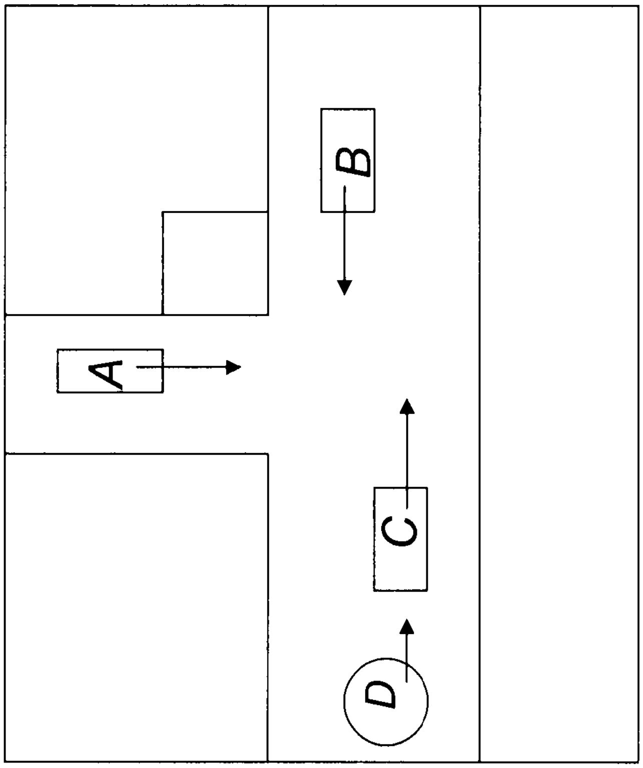
FIG. 8 shows an example of a common model generated by the common model generator according to an embodiment of the present invention.

FIG. 8 shows an example of a common model which is a representation of the relevant vicinity generated by the common model generator. In this example, the common model is depicted as an overhead view, however it should be noted that the common model itself is not necessarily shown to the user, nor are displays of the common model limited to strictly overhead views. The common model identifies the objects contained in the two separate views shown in FIGS. 6A and 6B in relation to each other. More importantly, the common model permits the calculation of the view from any location contained within the common model. In calculating the view from a source camera, the system may receive information of the location of the camera and the angle or orientation of view of the camera. Using the location and orientation information of multiple cameras, the common model generator can project back into a common data space from the multiple views which are received. With such a common data space, the common model generator can find common objects with a known location in the multiple views and use them to segregate other objects. Thus, if a fixed common object with a known location, such as a building or another landmark is determined in multiple views, then other objects (such as moving vehicles) can be singled out based on their relation to the fixed common object.

Having calculated the view from a particular location in the common model, a comparison to the moving objects contained within the model allows the CPU system to decide if the user vehicle lacks information about any of the other elements in the common model. When the user vehicle lacks information, images, video, or data streams containing that information can be selected by the Decision Unit for provision to the user vehicle to improve the available information about those objects, supplementing the user vehicles information about the environment of their relevant vicinity.

Figure 9:
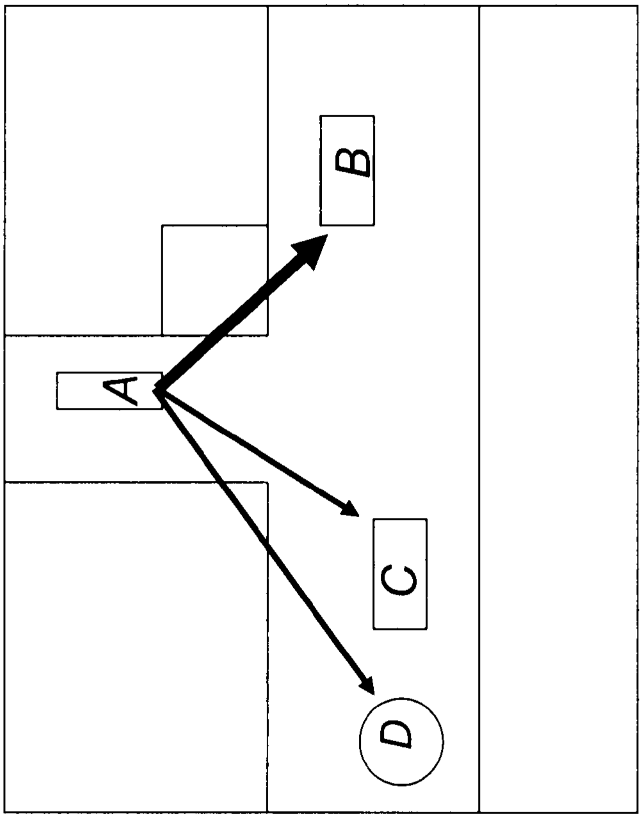
FIG. 9 shows an example of how the view selection unit estimates objects that are visible to the driver according to an embodiment of the present invention.
Figure 10:
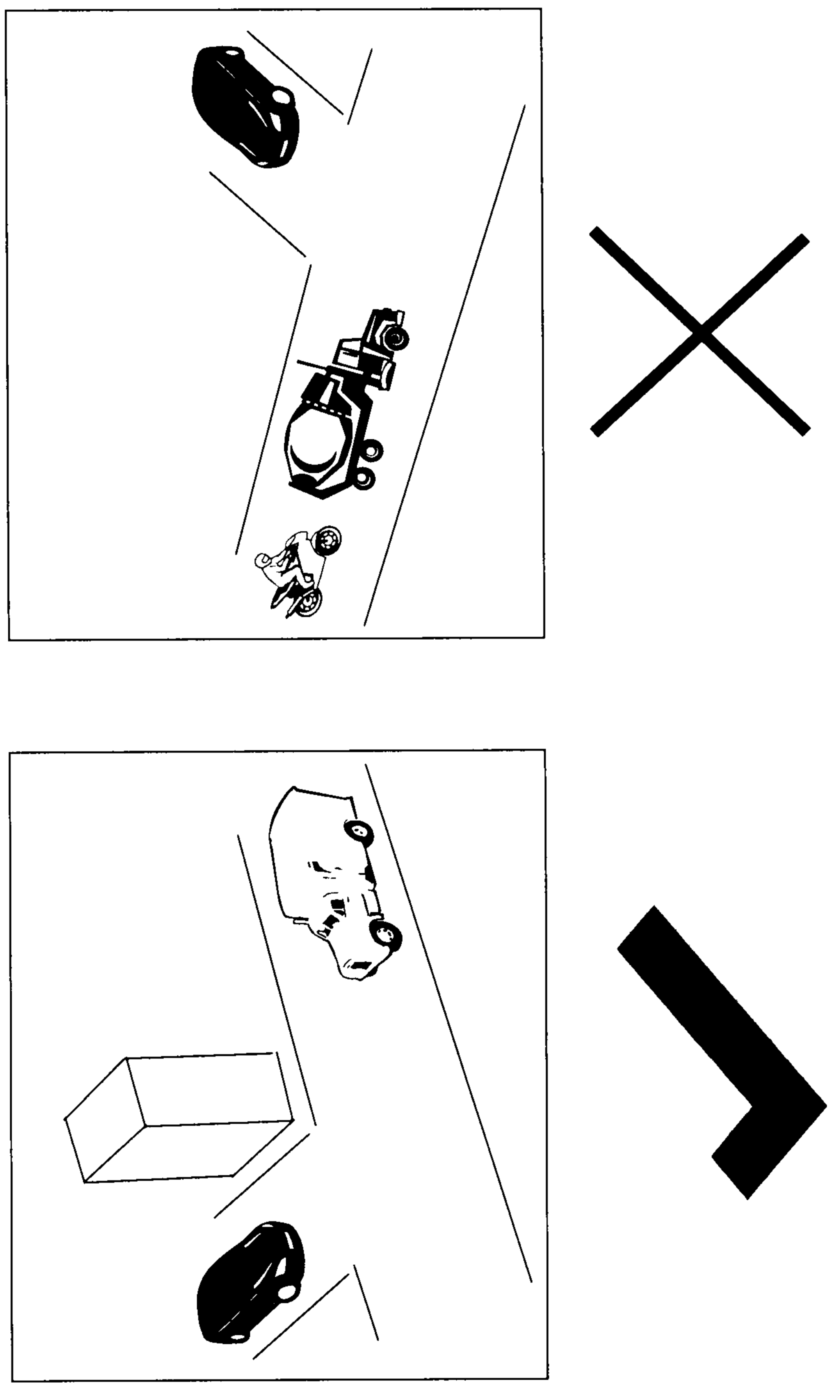
FIG. 10 shows an example of the view selection unit determining which view is a most informative view according to an embodiment of the present invention.

FIG. 9 shows that using the common model, the view selection unit estimates which objects are visible or obstructed to the driver of the user vehicle. This estimation may be performed by analyzing an estimated line of sight from the user vehicle to the object. In the example of FIG. 8, the building obstructs the estimated line of sight from the user vehicle A to the vehicle B. However, there is no obstruction from the estimated line of sight of the user vehicle A to either of vehicles C and D. Based on the above analysis, the view selection unit determines that vehicle A lacks information about vehicle B, and as depicted in FIG. 10, a view or views showing vehicle B are the most informative since it (they) provide a view of an object which the driver of the user vehicle may not be able to see on his own.

Thus, an initial decision made by the Decision Unit in determining a "most informative view" may be summarized as determining information about objects in the common model which the driver of the user vehicle is lacking or not aware of (for example, information of an object which the driver cannot see).

Next, the Decision Unit determines the information to be transmitted to or received by the driver vehicle, based on the information within the "most informative view". That information not already available to a driver from their current view is the highest priority information to transmit to the driver vehicle, as described above. Among that information not already directly visible to the driver vehicle, the highest priority information for the driver vehicle to receive and to incorporate into the driver vehicle's stored information about the environment is information which the driver vehicle has not already received, or which indicates a change from the information the driver vehicle recently received or was able to observe from its current location and orientation. The transmission of these high priority sets for information is in the format interpretable to the driver vehicle's on board decision and display unit (raw video directly from the observing and transmitting source, in one embodiment, or data indicating common model components in another more computational embodiment, according to the driver vehicle's version of the receiving and displaying system).

Once received, the transmitted information is displayed in the driver vehicle according to the display system capabilities available, or according to the display capabilities selected by the driver preference setting, when more than one display method is available within a single system. (Multiple example display methods and embodiments will be described shortly, below.)

Figure 11A:
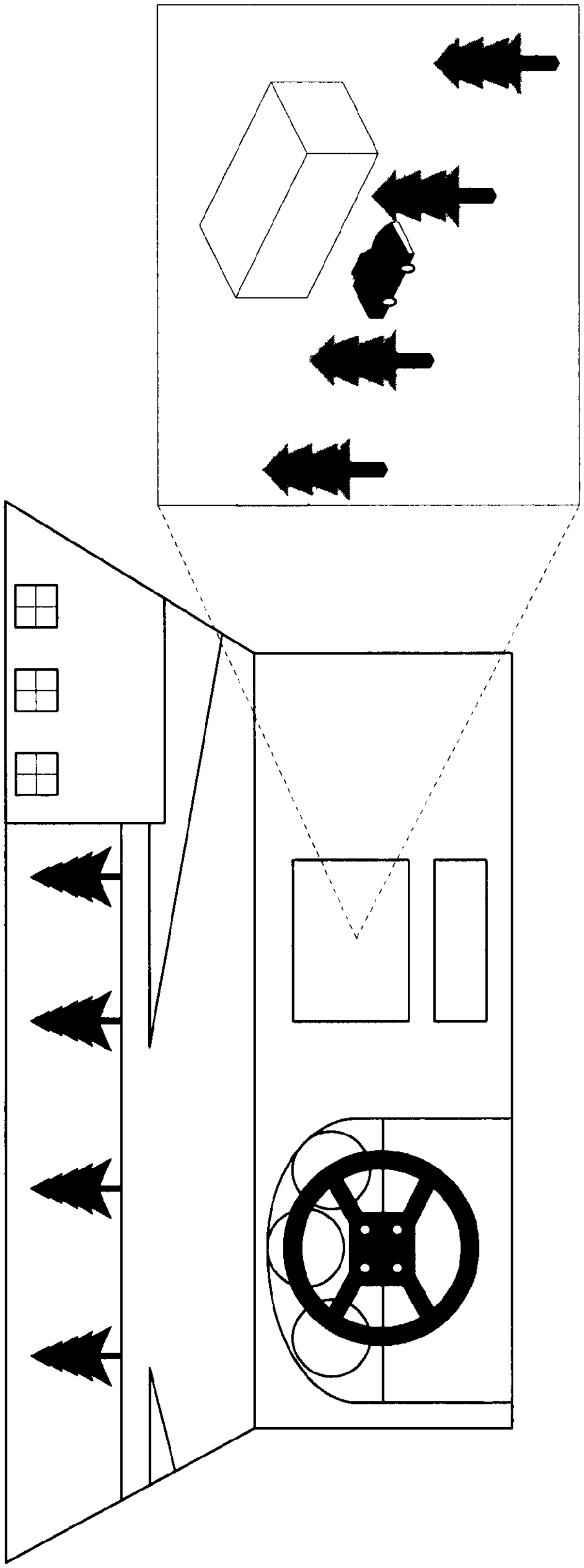
FIG. 11 shows an example of the different types of views that can be displayed for the user as the most informative view according to an embodiment of the present invention.
Figure 11B:
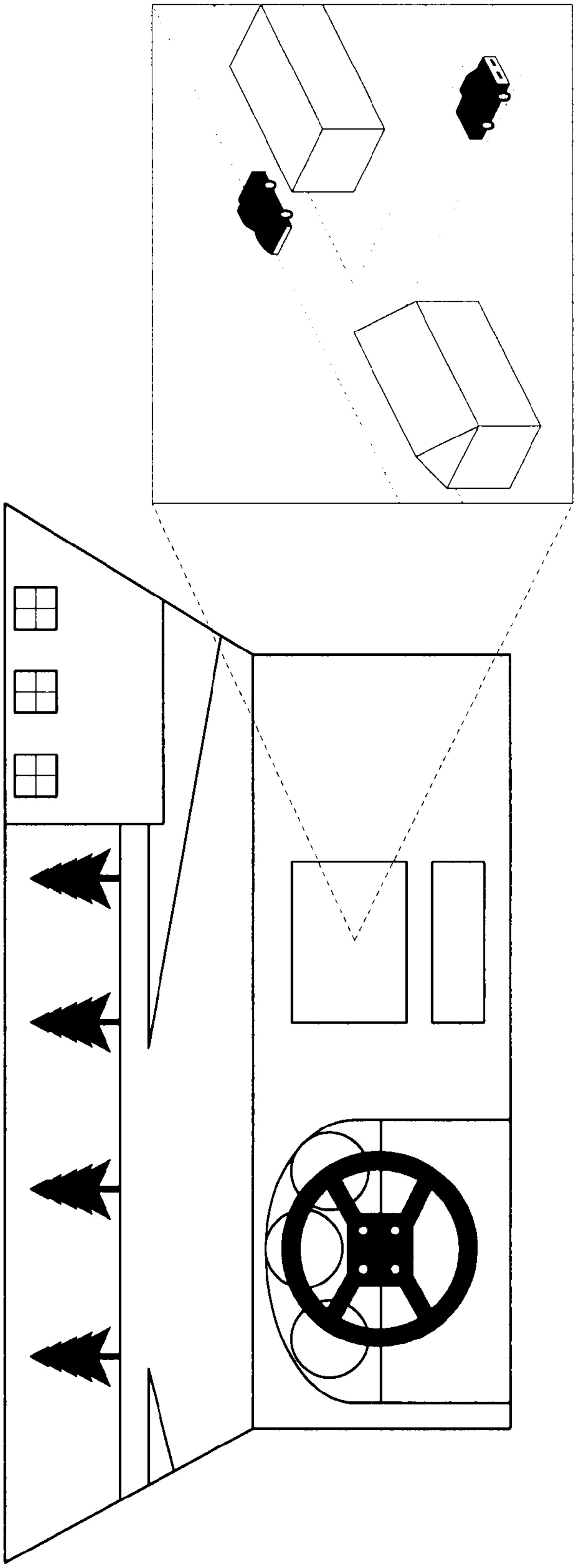
Figure 11C:
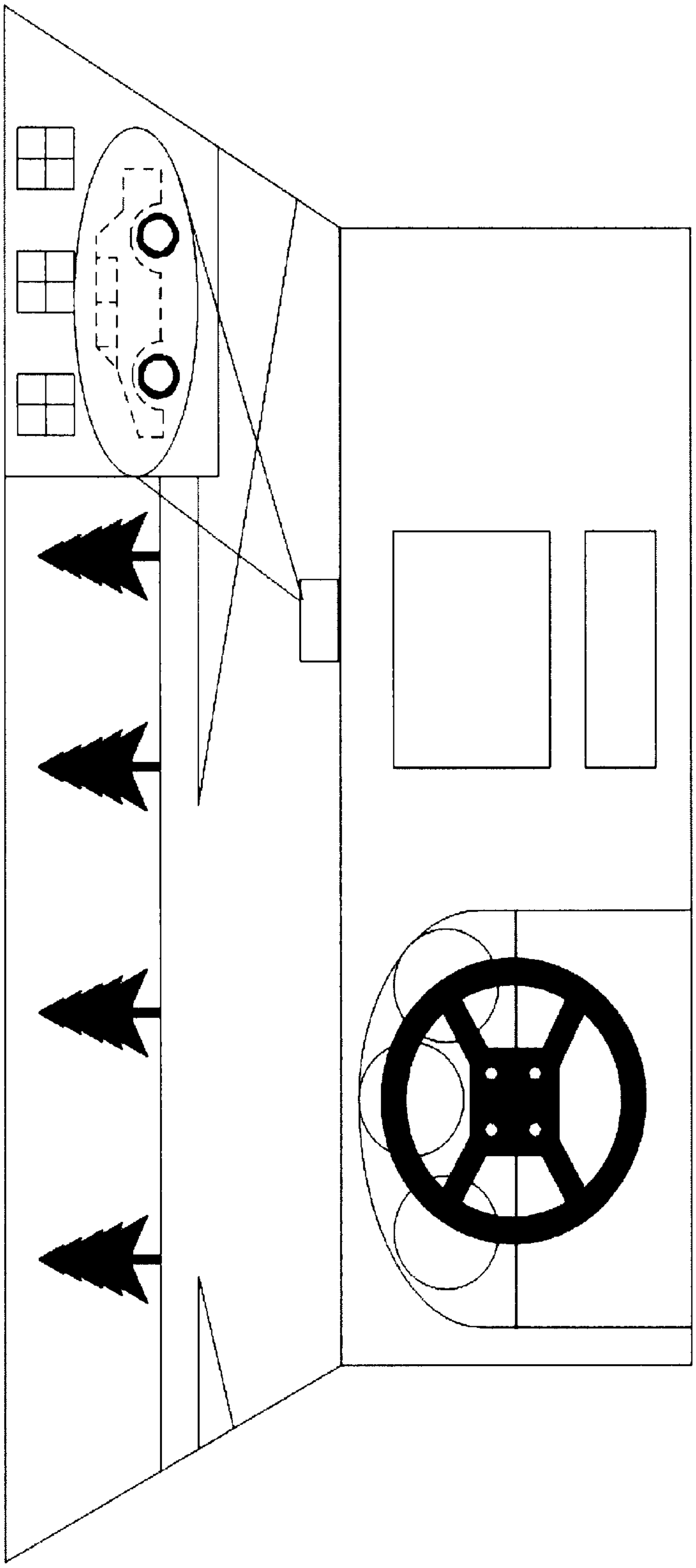

As shown in FIG. 11, there are different types of views which can be displayed for the user as the most informative view. The most simple example is to show the actual image data or video data (also called raw video data, above) received from a fixed camera or moving camera as the most informative view.

Another example of an informative view is a virtual 3D space of an area that may be generated from the various images and videos which are received at the Decision Unit. Programs for producing a virtual 3D space based on multiple images are known in the art and will be described briefly. A first step involves the analysis of multiple photographs taken of an area. Each photograph is processed using an interest point detection and a matching algorithm. This process identifies specific features, for example the corner of a window frame or a door handle. Features in one photograph are then compared to and matched with the same features in the other photographs. Thus photographs of the same areas are identified. By analyzing the position of matching features within each photograph, the program can identify which photographs belong on which side of others. By analyzing subtle differences in the relationships between the features (angle, distance, etc.), the program identifies the 3D position of each feature, as well as the position and angle at which each photograph was taken. This process is known scientifically as Bundle adjustment and is commonly used in the field of photogrammetry, with similar products available such as Imodeller, D-Sculptor, and Rhinoceros. An example of a program which performs the above technique for creating a 3D virtual space is Microsoft Photosynth.

When the 3D virtual space of a relevant vicinity has been generated, the user can manually use the input device place and orient themselves in the 3D virtual space, and to navigate the 3D virtual space. Alternately, the view of the virtual space can be automatically updated to track the position of the user vehicle. For example, the view can "move" down a street of the 3D virtual space and can turn around corners to see hidden objects in this space or adjust the opacity of objects in the virtual space to allow visualization "through" an existing object of other objects that are behind it and which might otherwise be hidden from the user vehicles current point of view.

Additionally, the 3D virtual space which is generated may pertain to a relevant vicinity local to the user vehicle. With such a relevant vicinity, the 3D virtual space can be combined with a "Heads up Display" (HUD) to provide the informative view on the inside windshield of the user vehicle. Head-up displays, which are known in the art, project information important to the driver on the windshield, making it easily visible without requiring the driver to look away from the road ahead. There are many different kinds of head-up displays. The most common displays employ an image generator that is placed on the dashboard and a specially coated windshield to reflect the images. Most systems allow the driver to customize the information that is projected.

An example of such a HUD system contains three primary components: a combiner, which is the surface onto which the image is projected (generally coated windshield glass); a projector unit, which is typically an LED or LCD display, but which could also employ other light projection systems such as a laser or set of lasers and mirrors to project them onto the combiner screen; and a control module that produces the image or guides the laser beams and which determines how the images should be projected. Ambient light sensors detect the amount of light coming in the windshield from outside the car and adjust the projection intensity accordingly.

In one embodiment, the HUD system receives image information of the 3D virtual space that is created as discussed above. Using the 3D virtual space from a point of view of the user vehicle, the HUD system can project hidden objects onto the windshield as "ghost images." For example, if the 3D virtual space includes a truck hidden behind a building, where the building is visible to the driver of the user vehicle, then the HUD system can project the 3D image of the truck at its location in relation to the user vehicle and the building (i.e., the view of the truck as if the building was partially transparent and the vehicle could be seen through it). In order to produce the ghost image on the user vehicle windshield, the point of view from the user's windshield is estimated in the 3D virtual space, and within the 3D virtual space the pixels of the object the user needs to see (the truck, in this example) are added to the pixels of the obstructing object (the building, in this example) to produce a "ghost image" (an image which appears to allow a viewer to see through one object to another behind it). The term "ghost image" originates from the fantastical quality of appearing as "see-through", or "semi-transparent", which is the effect of seeing the two entities superimposed in a single line of sight on the HUD.

Figure 12:
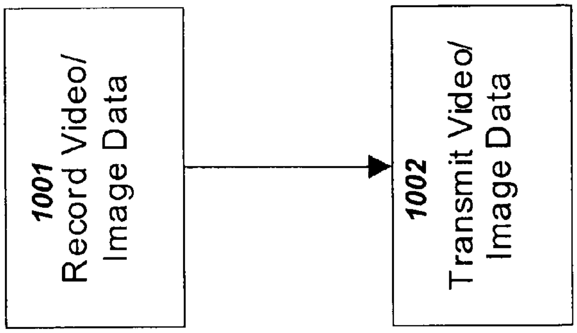
FIG. 12 shows a method performed by the moving camera system according to an embodiment of the present invention.
Figure 13:
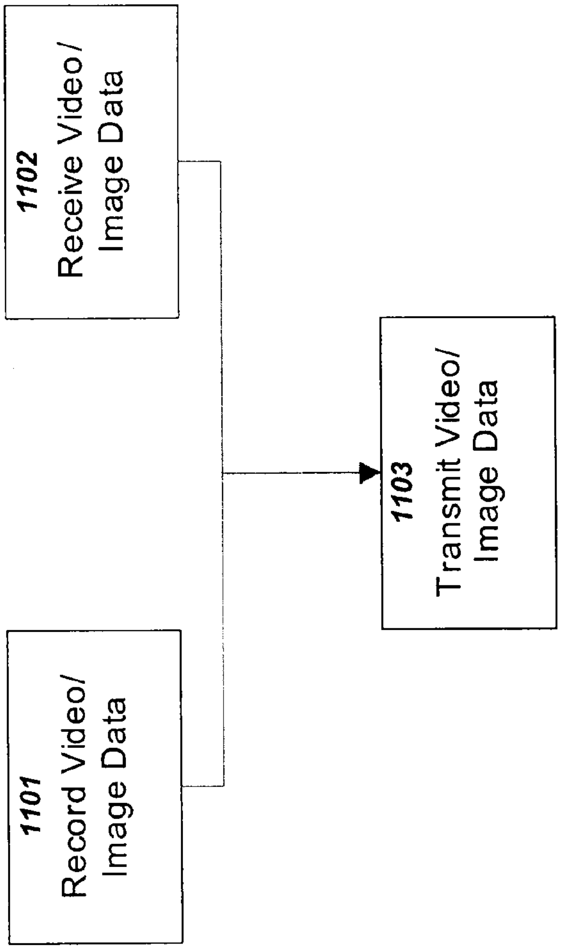
FIG. 13 shows a method performed by the fixed camera system according to an embodiment of the present invention.
Figure 14:
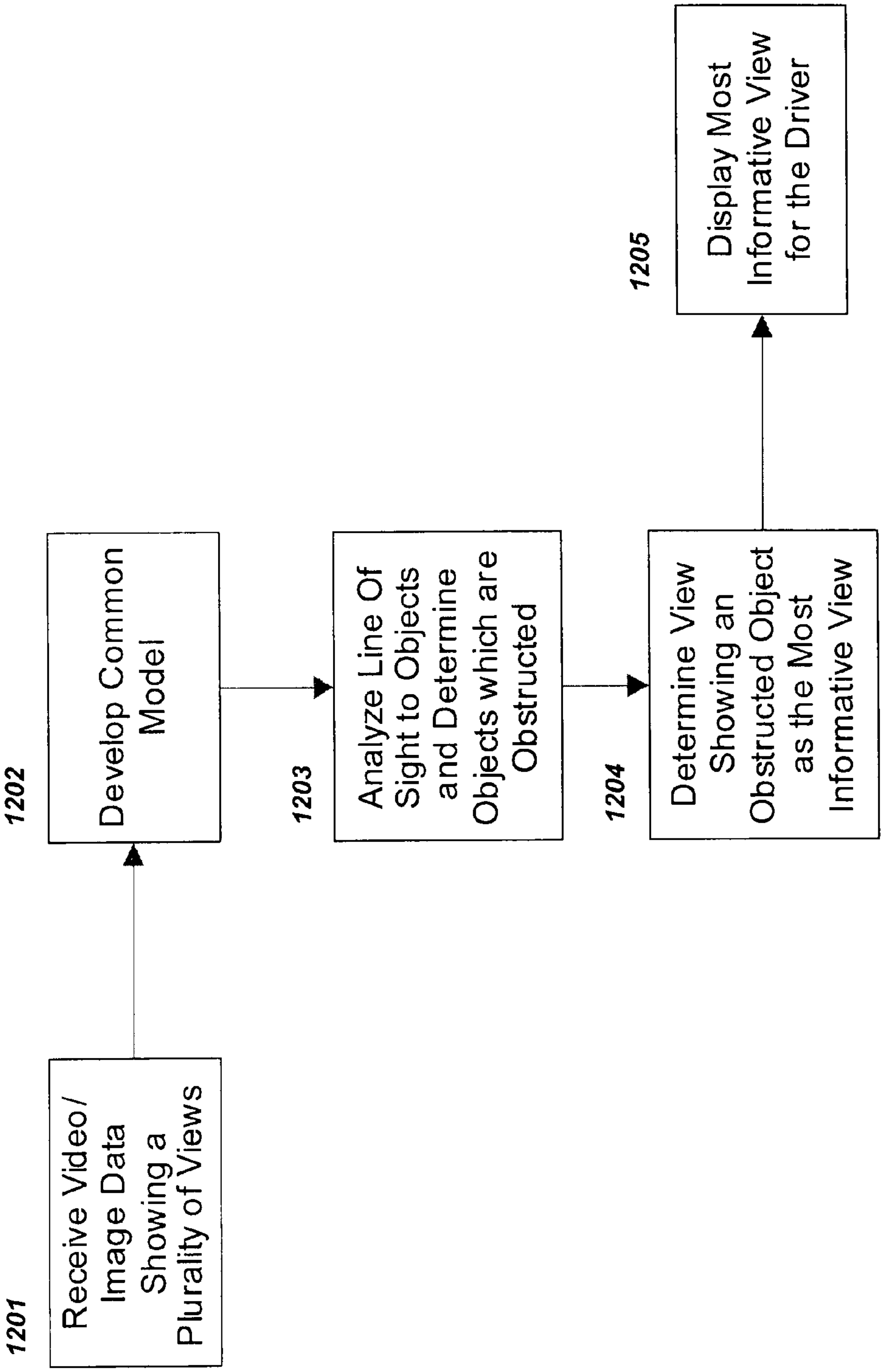
FIG. 14 shows a method performed by a decision unit according to an embodiment of the present invention.

FIGS. 12-14 show the different methods performed by the various elements in the above-mentioned system. FIG. 12 shows a method performed by the moving camera system. In Step 1001, the camera mounted on the vehicle records or captures live video or image data. In Step 1002, the communication unit transmits the live video or image data to the fixed camera station.

FIG. 13 shows a method performed by the fixed camera system. In Step 1101, the fixed camera system records or captures live video or image data from the fixed cameras. In Step 1102, the communication unit of the fixed camera system also receives live video or image data transmitted from the moving cameras mounted on vehicles, such as vehicle X. In Step 1103, the data received in Step 1101 and Step 1102 is transmitted to the user vehicle. This embodiment is the simplest one in terms of processing to be done by the base station, requiring the bulk of the processing and information selection to be done on the user vehicle.

FIG. 14 shows a method performed by the decision unit on the user vehicle, assuming the simple embodiment described above for FIGS. 10 and 11. In Step 1201, image data, video data, and/or GPS data are received from the fixed camera system. In Step 1202, a common model is developed from all of this received and captured data. This common model incorporates objects from different views in the received image data or video data as discussed above. In Step 1203, the line of sight from the user vehicle to the different objects is analyzed.

In Step 1204, a view showing an object whose line of sight from the user vehicle to the object is obstructed is determined to provide information the user vehicle cannot obtain without transmission from another source. A source with the most obstructed objects to which the user vehicle will need to respond is selected as a most informative view. In Step 1205, the most informative view is displayed for the driver of the user vehicle.

In the above example, the object that was obstructed from the view of the user vehicle was another vehicle. However, the object which is obstructed may also be a person or any other object of which the driver of the user vehicle needs to be aware.

Alternative Embodiments

In the above described example, the most informative view is determined to be a view which includes an object which is obstructed from the view of the driver of the user vehicle. However, the most informative view may also include a view of an empty parking space. Similar to the above-described example, the fixed camera system collects video and image data from the fixed cameras and the moving cameras and transmits the video and image data to the user vehicle. The decision unit then performs processing to determine if a parking space is available. For example, the decision unit performs object tracking with time to determine when a car leaves a parking spot by tracking the parked car when it is stationary and then detecting when the car is no longer in the parking spot.

In the above described example, the decision unit was located on the user vehicle. However, it should be appreciated that the decision unit may be located on another device, such as the fixed camera system. The decision unit may also be located separately with a communications unit to receive video data, image data, and GPS data from the fixed camera system, the moving camera system, and the user vehicle. In this case, the decision unit still receives all the necessary video data, image data, and GPS data, and determines the most informative view using a similar method as described above. The most informative view is then transmitted to the user vehicle for display.

The above described examples describe using a CPU. The CPU may be part of a general purpose computer, wherein the computer housing houses a motherboard which contains the CPU, memory such as DRAM (dynamic random access memory), ROM (read only memory), EPROM (erasable programmable read only memory), EEPROM (electrically erasable programmable read only memory), SRAM (static random access memory), SDRAM (synchronous dynamic random access memory), and Flash RAM (random access memory), and other special purpose logic devices such as ASICs (application specific integrated circuits) or configurable logic devices such as GAL (generic array logic) and reprogrammable FPGAs (field programmable gate arrays).

The computer may include a floppy disk drive; other removable media devices (e.g. compact disc, tape, and removable magneto optical media); and a hard disk or other fixed high density media drives, connected using an appropriate device bus such as a SCSI (small computer system interface) bus, an Enhanced IDE (integrated drive electronics) bus, or an Ultra DMA (direct memory access) bus. The computer may also include a compact disc reader, a compact disc reader/writer unit, or a compact disc jukebox, which may be connected to the same device bus or to another device bus.

The system may include at least one computer readable medium. Examples of computer readable media include compact discs, hard disks, floppy disks, tape, magneto optical disks, PROMs (e.g., EPROM, EEPROM, Flash EPROM), DRAM, SRAM, SDRAM, etc. Stored on any one or on a combination of computer readable media, the present invention includes software for controlling both the hardware of the computer and for enabling the computer to interact with a human user. Such software may include, but is not limited to, device drivers, operating systems and user applications, such as development tools.

Such computer readable media further includes the computer program product of the present invention for performing the inventive method herein disclosed. The computer code devices of the present invention can be any interpreted or executable code mechanism, including but not limited to, scripts, interpreters, dynamic link libraries, Java classes, and complete executable programs.

The invention may also be implemented by the preparation of application specific integrated circuits (ASICs) or by interconnecting an appropriate network of conventional component circuits, as will be readily apparent to those skilled in the art.

Numerous modifications and variations of the present invention are possible in light of the above teachings. It is therefore to be understood that within the scope of the appended claims, the invention may be practiced otherwise than as specifically described herein.

The invention claimed is:

1. A system for providing visual information to a driver of a first vehicle, comprising:

at least one camera or sensor which is not on the first vehicle but which captures image data that includes a view of a road within a vicinity of the first vehicle;

a receiver which receives image data from the at least one camera or sensor;

a decision unit which receives the image data from receiver and which identifies information in the image data which a driver of the first vehicle needs to be informed of; and a display unit on the first vehicle which displays information transmitted to the first vehicle in a view that displays information determined to be missing in the first vehicle's current line of sight, so that the otherwise missing information can be observed by a driver of the first vehicle, wherein the decision unit includes:

a common model generator configured to generate a common model, the common model being a representation of the area within the vicinity of the first vehicle; and an informative view determination unit configured to determine the information in the image data which the driver of the first vehicle needs to be informed of based on analyzing the common model, and the informative view determination unit determines the information in the image data which the driver of the first vehicle needs to be informed of based on a determination that an object contained in the image data is not within a line of unobstructed sight of the first vehicle.

2. The system according to claim 1, wherein the at least one camera or sensor is a fixed camera or sensor unit that captures a view from the location of the fixed camera or sensor unit.

3. The system according to claim 1, wherein the at least one camera or sensor is attached to a second vehicle which is within the vicinity of the first vehicle and which captures image data that includes a view from the second vehicle.

4. The system according to claim 1, wherein the common model is generated by identifying at least one common object with a known location in a plurality of views and determining a respective location of at least one additional object in the plurality of views based on the at least one additional object's relative location to the at least one common object.

5. The system according to claim 1, wherein the decision unit further comprises:

a view selection unit configured to select a form of the view for displaying the determined information to the driver of the first vehicle as virtual three-dimensional space.

6. The system according to claim 1, wherein the at least one camera or sensor is a 3D camera.

7. The system according to claim 1, wherein the receiver is co-located with the camera or sensor.

8. The system according to claim 1, wherein the decision unit is installed in the first vehicle.

9. The system according to claim 1, wherein the decision unit is co-located with the receiver.

10. The system according to claim 3, wherein each of the first vehicle and second vehicle has a GPS receiver which provides location information of the first vehicle and second vehicle respectively.

11. The system according to claim 3, wherein the decision unit receives location information of the first vehicle and second vehicle and determines a location of the second vehicle to the first vehicle based on the location information.

12. The system according to claim 4, wherein an object contained in the one of the plurality of views is an available parking spot.

13. The system according to claim 1, wherein the display unit displays the object not within the line of unobstructed sight of the first vehicle as the information determined to be missing in the first vehicle's current line of sight.

14. The system according to claim 13, wherein the display unit displays the object not within the line of unobstructed sight of the first vehicle by varying an opacity of an object within the line of unobstructed sight of the first vehicle.

15. A method, incorporated on a system for providing visual information to a driver of a first vehicle, comprising:

capturing from at least one camera or sensor image that is not on the first vehicle, data that includes a view of a road within a vicinity of the first vehicle;

receiving, at a receiver, image data from the at least one camera or sensor;

receiving, at a decision unit, the image data from the receiver, which includes a view of an area within the vicinity of the first vehicle, and determining information in the image data which the driver of the first vehicle needs to be informed of and selecting a view for displaying the determined information to a driver of the first vehicle;

displaying, at a display unit on the first vehicle, a view determined by the decision unit to include information in the image data of which a driver of the first vehicle needs to be informed;

generating, at the decision unit, a common model, the common model being a representation of the area within the vicinity of the first vehicle;

determining, at the decision unit, the information in the image data which the driver of the first vehicle needs to be informed of based on analyzing the common model; and determining, at the decision unit, the information in the image data which the driver of the first vehicle needs to be informed of based on determining that an object contained in the image data is not within a line of unobstructed sight of the first vehicle.

16. The method of claim 15, wherein the at least one camera or sensor is at a fixed location with a view of a road within a vicinity of the first vehicle.

17. The method of claim 15, wherein the at least one camera or sensor is attached to a second vehicle which is within the vicinity of the first vehicle.

18. The method according to claim 15, further comprising identifying at least one common object with a known location in a plurality of views and determines a respective location of at least one additional object in the plurality of views based on the at least one additional object's relative location to the at least one common object.

19. The method according to claim 15, further comprising displaying the object not within the line of unobstructed sight of the first vehicle as the information in the image data of which the driver of the first vehicle needs to be informed.

20. The method of claim 19, further comprising displaying the object not within the line of unobstructed sight of the first vehicle by varying an opacity of an object within the line of unobstructed sight of the first vehicle.

* * * * *